United States Patent [19]

Lee et al.

[11] Patent Number: 5,756,412
[45] Date of Patent: May 26, 1998

[54] DIELECTRIC CERAMIC COMPOSITION

[75] Inventors: Hyo-Jong Lee; Hyuk-Joon Youn; Kug-Sun Hong; Byung-Kyu Kim, all of Seoul, Rep. of Korea

[73] Assignee: Amotron Co., Ltd., Kyung Ki-do, Rep. of Korea

[21] Appl. No.: 795,174

[22] Filed: Feb. 4, 1997

[30] Foreign Application Priority Data

Jun. 11, 1996 [KR] Rep. of Korea ............... 1996-20851

[51] Int. Cl.$^6$ ................................................. C04B 35/02
[52] U.S. Cl. ............................................................ 501/135
[58] Field of Search ................................................ 501/135

[56] References Cited

FOREIGN PATENT DOCUMENTS

| | | | |
|---|---|---|---|
| 405274913 | 10/1993 | Japan | 501/135 |
| 406076632 | 3/1994 | Japan | 501/135 |

*Primary Examiner*—Deborah Jones
*Attorney, Agent, or Firm*—McDermott, Will & Emery

[57] ABSTRACT

A dielectric ceramic composition for microwave applications consists essentially of the compound having a formula $B'B_2''O_6$, wherein $B'$ is at least one metal selected from the group of Mg, Ca, Co, Mn, Ni and Zn, and wherein $B''$ is one of Nb or Ta, and additionally includes at least one compound selected from the group of CuO, $V_2O_5$, $La_2O_3$, $Sb_2O_5$, $WO_3$, $MnCO_3$, MgO, $SrCO_3$, ZNO, and $Bi_2O_3$ as an additive, wherein the amount of the additive is 0.05% to 2.0% by weight of the total weight of the composition.

11 Claims, No Drawings

DIELECTRIC CERAMIC COMPOSITION

TECHNICAL FIELD

The present invention relates to dielectric ceramic compositions for microwave application and, more particularly, to dielectric ceramic compositions for microwave devices such as, for example, those having a dielectric resonator designed to operate in a microwave frequency range.

BACKGROUND ART

Recently, telecommunications such as mobile communication and satellite communication have focused a growing interest in dielectric ceramic devices for microwave application. In particular, mobile communication arrangements which include automobile telephones, a cellular phones, pagers and GPS (Global Positioning Systems) employ microwave dielectric materials which are required to posses various electrical and physical properties such as, for example, high permittivity ($\epsilon$), high quality factor(Q), small temperature coefficient of resonance frequency ($\tau_f$), and good sintering characteristics.

Studies pertaining to dielectric compositions for microwave applications have been directed to dielectric compositions of the $TiO_2$ type. As the result, it has been determined that $TiO_2$ based dielectric compositions including $Ba_2Ti_9O_2O$ $(Zr,Sn)$ $TiO_4$, $BaO-Re_2O_3-TiO_2$ (Re:Rare earth) and $BaO-Nd_2O_3-TiO_2$ (BNT type) along with dielectrics having a complex perovskite structure such as Ba $(Mg_{1/3}$ $Ta_{2/3}$ $)O_3 Ba$ $(Zn_{1/3} Ta_{2/3}$ $)O_3$ and Ba $(Mg_{1/3} Nb_{2/3}$ $)O_3$ are suitable for the above type of application. Further, efforts are being actively directed to the development of new dielectric materials which are formed using solid solutions of two or more ceramic compositions having perovskite structures.

The dielectrics of the BNT type, however, present problems in that they have Q factor smaller than other dielectrics with respect to high frequency and exhibit a limited resonance frequency below 1 GHz. Further, $Nd_2O_3$ is a rare-earth metal which is a costly compared with other elements.

With regard to dielectrics of $(Zr,Sn)TiO_4$ type, which are widely used due to their high Q factor and stable temperature characteristics, permittivity is in the range of 30 to 40, Q factor is about 8000 at 4 GHz and temperature coefficient of resonance frequency (Ef) is in the range of −30 to +30 ppm/° C. This composition which is manufactured by a general solid phase reaction, is, however, sintered at a sintering temperature above 1600° C., and is difficult to sintered at low temperatures without the addition of sintering agent such as CuO, $CO_2O_3$, ZnO, and the like. However, the addition of the sintering agent deteriorates the physical properties of the ceramic composition.

Although various liquid phase methods are used for powder syntheses (e.g. Sol-Gel, alkoxide and coprecipitation methods), these methods are too complex to carry out econmically and result in the rise of a production costs.

Dielectrics of complex perovskite type ceramic compositions, for example, $Ba(Zn_{1/3}$ $Ta_{2/3}$ $)O_3$, are also difficult to sinter because of a sintering temperature above 1550° C. Furthermore, it is difficult to control the numerous process factors in case that agents such as $BaZrO_3$ and Mn are added to decrease the sintering temperature.

As the size of electronic equipment such as dielectric filters becomes smaller, multilayer devices has been considered in connection with the necessary miniaturization. However, the production of such arrangements requires that the dielectric material and the electrodes be co-fired. In order to use low-priced Ag or Cu electrodes, the dielectric material must exhibit a low sintering temperature. For this reason, it still remains necessary to develop new dielectric ceramic compositions which have good sintering characteristics and simple compositions as well as at least still having the characteristics of conventional dielectric ceramic compositions necessary for microwave applications.

DISCLOSURE OF THE INVENTION

Studies have focused on materials having a binary system of the $ABO_3$ type which exhibit a cubic complex perovskite structure with an ion at the B site. As a result, it was discovered that the dielectric ceramic compositions of the present invention exhibits dielectric characteristics such as a permittivity and a Q factor, which are similar to those of ceramic compositions having complex perovskite structures, but which can be sintered at lower temperatures than the conventional complex perovskite structures.

It is therefore an object of the present invention to provide dielectric ceramic compositions for microwave applications with desired electrical and physical properties, which overcome the above-mentioned limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof.

To achieve the foregoing object and advantages, there is provided a dielectric ceramic composition for microwave applications consisting essentially of the general formula $B'B''_2O_6$, wherein the B' is, at least one element selected from the group of Mg, Ca, Co, Mn, Ni and Zn, and wherein B'' is at least one of Nb and Ta.

From the experimental results of the $B'B''_2O_6$ dielectric ceramic composition shown in Tables. 1 and 2, it was established that the temperature coefficient of resonant frequency is positive for $B'Ta_2O_6$ type, but negative for $B'Nb_2O_6$ type. This, therefore, rendered it possible to regulate the resonant frequency temperature coefficient to have a positive or negative value that approximates zero, by forming a solid solution designed with proper mole fractions of dielectrics of $B'Nb_2O_6$ type and $B'Ta_2O_6$ type.

In general, various additives are added to the dielectric ceramic compositions in order to improve the dielectric characteristics and to reduce the sintering temperature. For example, additives such as $MnCO_3$, MgO, $SrCO_3$ or ZnO improve the dielectric characteristics and other substances of low melting points such as glass, or oxides of Pb, Bi or V decrease the sintering temperature and to cause the composition to be sintered to have a liquid phase.

An additive oxide amount of less than 0.05% by weight of the total weight of the composition, is not effective. However, an oxide content of more than 2.0% by weight may deteriorate the dielectric characteristics of the composition due to the possibility of the formation of a second phase. For this reason, the content of the additive is, preferably, 0.05% to 2.0% by weight of the total weight of the dielectric composition in the present invention.

It is to be understood that both the foregoing general description and the following detailed description are exemplary and explanatory and are intended to provide further explanation of the invention as claimed.

DETAILED DESCRIPTION OF PREFERRED EMBODIMENT

EMBODIMENT 1

Powdered pure $Nb_2O_5$ or $Ta_2O_5$, B'O(B'=Mg, Zn, Co, Ni), $Mn_3O_4$ or $CaCO_3$, used as starting materials, were quantitatively weighed and mixed together with purified water into a $ZrO_2$ ball. After having been wet-milled for 24 hours, the mixture was rapidly dried by spraying on a hot plate in order to suppress a powder-classification according to the specific gravity. The dried powders were calcined in an aluminum crucible at 900° to 1050° C. for 2 hours so as to obtain B'$Nb_2O_6$ or B'$Ta_2O_6$ powders and again milled together with purified water in the same ball mill as used above, for 24 hours. After having been dried with moderate moisture in an oven at 100° C., the ground material was molded into a disk of 10 mm×3 to 4 mm under the pressure of 1000 Kg/cm2, and sintered at 1150° to 1600° C. for 2 hours. The temperature was increased by 5° C. per a minute during the calcination or the sinter and then the powders were cooled.

In such a manner, there were obtained specimens of various compositions as shown in Tables 1 and 2. The Q factor and the permittivity ($\epsilon$) of each specimen were measured with the Hakki-Coleman Post resonator method using a network analyzer (HP 8510), and the high Q factor of certain specimens were measured using a Cavity method.

TABLE 1

Dielectric Characteristics of B'$Nb_2O_6$

| COMPOSITION | SINTERING TEMPERATURE (°C.) | PERMITTIVITY | Q × f | TEMPERATURE COEFFICIENT OF RESONANCE FREQUENCY ($\tau_f$) |
|---|---|---|---|---|
| $MgNb_2O_6$ | 1300 | 21.4 | 93800 | −51.4 |
| $CaNb_2O_6$ | 1400 | 19.6 | 21500 | 13.3 |
| $MnNb_2O_6$ | 1150 | 22.4 | 34300 | −59.6 |
| $CoNb_2O_6$ | 1100 | 22.8 | 11300 | −44.7 |
| $NiNb_2O_6$ | 1150 | 22.6 | 40100 | −38.0 |
| $ZnNb_2O_6$ | 1150 | 25.0 | 83700 | −61.3 |

TABLE 2

Dielectric Characteristics of B'$Ta_2O_6$

| COMPOSITION | SINTERING TEMPERATURE (°C.) | PERMITTIVITY | Q × f | TEMPERATURE COEFFICIENT OF RESONANCE FREQUENCY ($\tau_f$) |
|---|---|---|---|---|
| $MgTa_2O_6$ | 1550 | 30.3 | 59600 | 30.2 |
| $CaTa_2O_6$ | 1600 | 21.2 | 11600 | 1.0 |
| $MnTa_2O_6$ | 1350 | 20.3 | 16500 | −43.9 |
| $CoTa_2O_6$ | 1500 | 29.0 | 2300 | 3.0 |
| $NiTa_2O_6$ | 1600 | 25.0 | 31000 | 35.0 |
| $ZnTa_2O_6$ | 1350 | 37.6 | 65300 | 10.8 |

The value of Q varies in a broad range according to the sintering temperature. Accordingly, the sintering temperature was fixed at the temperature where the highest Q factor was obtained as the result of repeated measurements. The permittivities ($\epsilon$) were measured at a fixed sintering temperature because they do not vary with different sintering temperatures.

As is apparent from Tables 1 and 2, the dielectrics of B'$Nb_2O_6$ type exhibit small values of Q factor being about 20 to 25 and $ZnNb_2O_6$ or $MgNb_2O_{66}$ has Q factors(Q×f) equal to that of the complex perovskite. The complex perovskite is sintered at 1500° C. but $ZnNb_2O_6$ and $MgNb_2O_6$ are sintered at still lower temperatures in the range of 1100° to 1300° C. In particular, $ZnNb_2O_6$ is as useful as the dielectric for high frequency because of its good dielectric characteristics, and is sintered at a low temperature, for example, a permittivity of 25 and a Q factor of 83700(10 GHz), and a sintering temperature of 1150° C.

The dielectrics of B'$Ta_2O_6$ type have higher sintering temperatures, slightly lower Q factors and slightly higher permittivities than those of B'$Nb_2O_6$ type. For example, $ZnTa2O6$ which exhibits a permittivity of about 38 and a Q factor of 65000(10 GHz), has more excellent dielectric characteristics and a slightly lower sintering temperature than a conventional $(Zr,Sn)TiO_4$. Further, $ZnTa_2O_6$ is expected to be alternatively similar to $(Zr,Sn)TiO_4$ which is sintered at the temperature that corresponds to the sintering temperature with the addition of another sintering agent or under a complex process such as a Sol-Gel method.

EMBODIMENT 2

The preparation and measurements of the powders of B'$Nb_2O_6$ type were carried out in the same manner as in embodiment 1. The calcinated powders were weighed in accordance with the predetermined formulation and milled together with purified water in the same ball mill as used above for 24 hours. After having been dried with moderate moisture in an oven at 100° C., the ground material was molded into a disk of 10 mm×3 to 4mm under the pressure of 1000 Kg/cm2, and sintered at 1200° to 1400° C. for 2 hours. The temperature was increased by 5° C. per minute during the calcination or the sinter and then the powders were cooled.

In such a manner, there were obtained specimens of various compositions as shown in Tables 3 and 4. The Q factor and the permittivity ($\epsilon$) of each specimen were measured with the Post resonator method of Hakki-Coleman by using a network analyzer (HP 8510), and the high Q factor of certain specimen was measured with a Cavity method.

TABLE 3

Dielectric Characteristics of Solid Solution Compositions According to the Present Invention.

| COMPOSITION | PERMITTIVITY | Q × f | TEMPERATURE COEFFICIENT OF RESONANCE FREQUENCY ($\tau_f$) |
|---|---|---|---|
| $Mg(Nb_{0.1}Ta_{0.9})_2O_6$ | 21.7 | 80100 | −23.2 |
| $Mg(Nb_{0.2}Ta_{0.8})_2O_6$ | 18.8 | 56300 | −45.5 |
| $Mg(Nb_{0.4}Ta_{0.6})_2O_6$ | 19.4 | 64400 | −45.7 |
| $Mg(Nb_{0.6}Ta_{0.4})_2O_6$ | 20.0 | 69600 | −51.5 |
| $Mg(Nb_{0.8}Ta_{0.2})_2O_6$ | 20.3 | 93000 | −53.7 |
| $Zn(Nb_{0.1}Ta_{0.9})_2O_6$ | 37.1 | 38000 | −5.7 |
| $Zn(Nb_{0.1}Ta_{0.9})_2O_6$ | 33.6 | 48100 | 3.4 |
| $Zn(Nb_{0.1}Ta_{0.9})_2O_6$ | 33.6 | 45000 | −5.8 |
| $Zn(Nb_{0.1}Ta_{0.9})_2O_6$ | 30.5 | 53000 | −8.0 |
| $Zn(Nb_{0.1}Ta_{0.9})_2O_6$ | 24.0 | 54000 | −51.6 |
| $Ni(Nb_{0.4}Ta_{0.6})_2O_6$ | 23.6 | 27000 | 5.9 |
| $Ni(Nb_{0.4}Ta_{0.6})_2O_6$ | 23.1 | 29000 | 1.3 |
| $Ni(Nb_{0.4}Ta_{0.6})_2O_6$ | 22.7 | 35000 | −3.6 |

TABLE 4

Dielectric Characteristics of Solid Solution Compositions According to the Present Invention.

| COMPOSITION | $\epsilon$ | Q × f | TEMPERATURE COEFFICIENT OF RESONANCE FREQUENCY ($\tau_f$) |
|---|---|---|---|
| $Ca_{1/3}Zn_{2/3}Nb_2O_6$ | 19.5 | 24000 | −52.5 |
| $Ca_{1/3}Zn_{2/3}Nb_2O_6$ | 19.0 | 30000 | −46.8 |
| $Mg_{1/3}Zn_{2/3}(Nb_{0.5}Ta_{0.5})_2O_6$ | 30.4 | 56000 | −51.3 |
| $Mg_{1/2}Zn_{1/2}(Nb_{0.5}Ta_{0.5})_2O_6$ | 28.7 | 59200 | −52.5 |
| $Mg_{1/2}Zn_{1/2}(Nb_{0.5}Ta_{0.5})_2O_6$ | 25.9 | 57600 | −53.0 |

The value of Q varies in a broad range according to the sintering temperature, so that the sintering temperature was fixed in the range of 1250° to 1350° C. where the highest Q factor was obtained as the result of repeated measurements. The sintering temperature was increased according to the contents of Ta.

In the solid solutions of B'NbTa type, B' is a single metal in Table 3 and two metals in Table 4.

It is apparent that the temperature coefficient of resonant frequency is in the range of −10° C. to +10° C. for the solid solutions of ZnNbTa and NiNbTa. The permittivity of $Zn(Nb_{0.6}Ta_{0.4})_2O_6$ in particular, is extremely low because of the transition in crystalline structure. The crystalline structure exerts a marked effect on both the permittivity and the temperature coefficient of resonant frequency when the mole fraction of Ta is 0.5. However, it did not influence the Q values.

EMBODIMENT 3

After dielectric ceramic compositions were prepared in the same manner as in the embodiments 1 and 2 in the form of powders, at least one oxide of $La_2O_3$, $Sb_2O_5$, $Bi_2O_3$, CuO, ZnO, MgO, $SrCO_3$, $MnCO_3$, $WO_3$ and $V_2O_5$ was added. This powder mixture was mixed with water in the ratio of 1 to 1 and wet-milled into a $ZrO_2$ ball for 24 hours. The mixture was then rapidly dried and calcinated in an alumina crucible at 900° to 1050° C. for 2 hours. After being milled for 24 hours and dried by spraying on a hot plate, the ground material was molded into a disk of 10 mm×3mm under the pressure of 1000 Kg/cm$^2$ and sintered at 1150° to 1400° C. for 2 to 6 hours. The temperature was increased by 5° C. per a minute during the calcination or the sinter and then the powders were cooled.

In such a manner, there were obtained specimens of various compositions as shown in Table 5. The Q factor and the permittivity ($\epsilon$) of each specimen were measured by the Hakki-Coleman Post resonator method using a network analyzer(HP 8510) at 10 GHz, and the high Q factor of certain specimen was measured using a Cavity method.

TABLE 5

Dielectric Characteristics of Dielectric Ceramic Compositions Mixed with Additives According to the Present Invention.

| COMPOSITIONS | ADDITIVES (wt %) | $\epsilon$ | $\tau_f$ | Q × f | SINTERING TEMPERATURE (°C.) |
|---|---|---|---|---|---|
| $ZnNb_2O_6$ | CuO(1) | 21.5 | −60.7 | 61700 | 950 |
| $ZnNb_2O_6$ | CuO(2) | 19.0 | −70.5 | 29400 | 900 |
| $ZnNb_2O_6$ | $Sb_2O_5(1)$ | 19.8 | −32.5 | 25000 | 875 |
| $Zn(Nb_{0.4}Ta_{0.6})_2O_6$ | $Bi_2O_3(1)$ | 22.3 | −60.9 | 63200 | 1000 |
| $Zn(Nb_{0.4}Ta_{0.6})_2O_6$ | $V_2O_5(1)$ | 20.0 | −81.0 | 16880 | 900 |
| $Zn(Nb_{0.4}Ta_{0.6})_2O_6$ | $V_2O_5(1)$ | 28.2 | −19.0 | 21000 | 950 |
| $Zn(Nb_{0.4}Ta_{0.6})_2O_6$ | CuO(1) | 30.1 | −40.6 | 20500 | 950 |
| $Zn(Nb_{0.4}Ta_{0.6})_2O_6$ | CuO + $Bi_2O_3(1)$ | 32.3 | −5.2 | 19800 | 950 |
| $Zn(Nb_{0.4}Ta_{0.6})_2O_6$ | $MnCO_3(0.1)$ | 36.2 | −3.1 | 59000 | 1350 |
| $Zn(Nb_{0.4}Ta_{0.6})_2O_6$ | $La_2O_3(1)$ | 35.5 | −5.0 | 44700 | 1350 |
| $Zn(Nb_{0.4}Ta_{0.6})_2O_6$ | $WO_3(0.1)$ | 30.6 | 2.5 | 45500 | 1350 |
| $Zn(Nb_{0.4}Ta_{0.6})_2O_6$ | MgO(0.1) | 30.2 | −6.4 | 56300 | 1350 |
| $Zn(Nb_{0.4}Ta_{0.6})_2O_6$ | ZnO(0.1) | 33.5 | −1.4 | 45400 | 1300 |
| $Zn(Nb_{0.4}Ta_{0.6})_2O_6$ | $SrCO_3(0.1)$ | 38.2 | 5.9 | 48900 | 1350 |

By adding oxides such as CuO, $V_2O_5Bi_2O_3$ and $Sb_2O_5$ to the dielectrics of $ZnNb_2O_6$ or $Zn(Nb,Ta)_2O_6$, the sintering temperature was successfully lowed below 900° C. as shown in Table 5. The resultant compositions exhibited excellent Q-factor of about 20000(at 10 GHz), higher than that of any other composition at same sintering temperature.

In other cases, by adding glass, the dielectric of BaOPbO-$Nd_2O_3$-$TiO_2$ whose sintering temperature is 1300° C., was sintered at 900° C. and exhibited permittivity of 67, Q factor of 2900(5.1 GHz) and temperature coefficient of resonance frequency of 20 ppm/° C. Further, the dielectric of $CaZrO_3$, whose sintering temperature is 1350° C., was sintered at 980° C. and exhibited permittivity of 25, Q factor of 3500(5 GHz) and temperature coefficient of resonant frequency of ±10 ppm/° C. with an addition of glass. Since Bi itself has a low melting point of 825° C., the sintering temperature was successfully lowered to 875° C. by adding CuO and $V_2O$, to the dielectric of $BiNbO_4$. The resultant composition exhibited permittivity of 43, Q factor of 10000(4.3 GHz) and temperature coefficient of resonance frequency of about 38.

In addition to this, the Q factors were increased by adding oxides such as $MnCO_3$, MgO, ZnO and the like to the solid solutions of $Znt(Nb,Ta)_2O_6$. The present invention, thus, exhibits much more excellent dielectric characteristics than the conventional dielectrics of $(Zn,Sn)TiO_4$ in current use.

By lowering the sintering temperature to 900° C. below, it is possible to carry out a multilayer process using low cost Ag or Cu electrodes in miniaturized electronic devices.

As described above, compared with the conventional dielectric ceramic compositions for microwave applications, including dielectrics which have a complex perovskite structure, the dielectric compositions according to the present invention exhibit similar dielectric characteristics such as Q factors. Furthermore, they can be sintered at relatively low temperatures and prepared according to extremely simple formulations with ease.

It will be apparent to those skilled in the art that various modifications and variations can be made in high frequency dielectric ceramic compositions according to the present invention without departing from the spirit or scope of the invention. Thus, it is intended that the present invention cover the modifications and variations of this invention provided they come within the scope of the appended claims and their equivalents.

What is claimed is:

1. A dielectric ceramic composition for microwave applications consisting essentially of the compound having the formula B'B$_2$"O$_6$, wherein the B' is at least one metal selected from the group of Mg, Co, Mn, Ni and Zn, and the B" is selected from the group of Nb and Ta, and an additive wherein the amount of additive is 0.05% to 2.0 by weight of the total weight of the composition.

2. The dielectric ceramic composition defined as in claim 1, wherein said additive consists of at least one compound selected from the group of CuO, $V_2O_5$, $La_2O_3$, $Sb_2O_5$, $WO_3$, MgO, $SrCO_3$, ZnO, and $Bi_2O_3$.

3. A dielectric ceramic composition for microwave frequency consisting essentially of a solid solution which is a mixture of B'Nb$_2O_6$ and B'Ta$_2O_6$ in a mole fraction, wherein B' is at least one metal selected from the group of Mg, Co, Mn, Ni and Zn, and an additive in an amount of 0.05% to 2.0% by weight of the composition.

4. The dielectric ceramic composition defined as in claim 3, wherein said additive consists of at least one compound selected from the group of CuO, $V_2O_5$, $La_2O_3$, $Sb_2O_5$, $WO_3$, MgO, $SrCO_3$, ZnO, and $Bi_2O_3$.

5. A dielectric ceramic composition for microwave frequency consisting essentially of a solid solution which is a mixture of B'Nb$_2O_6$ and B'T$_2O_6$ in a mole fraction, wherein B' is Zn, and an additive in an amount of 0.05% to 2.0% by weight of the composition.

6. The dielectric ceramic composition defined as in claim 5, wherein the mole fraction of $ZnNb_2O_6$ is 0.2 to 0.5.

7. A dielectric ceramic composition for microwave frequency consisting essentially of a solid solution which is a mixture of $B'Nb_2O_6$ and $B'Ta_2O_6$ in a mole fraction, wherein $B'$ is Mg, and an additive in an amount of 0.05% to 2.0% by weight of the composition.

8. The dielectric ceramic composition defined as in claim 7, wherein the mole fraction of $MgNb_2O_6$ is less than 0.1.

9. A dielectric ceramic composition for microwave frequency consisting essentially of a solid solution which is a mixture of $B'Nb_2O_6$ and $B'Ta_2O_6$ in a mole fraction, wherein $B'$ is at least one of Zn and Mg, and an additive in an amount of 0.05 to 2.0% by weight of the composition.

10. The dielectric ceramic composition defined as in claim 5, wherein the additive is at least one compound selected from the group of CuO, $V_2O_5$, $La_2O_3$, $Sb_2O_5$, $WO_3$, MgO, $SrCO_3$, ZnO, and $Bi_2O_3$.

11. The dielectric ceramic composition defined as in claim 6, wherein the additive is at least one compound selected from the group of CuO, $V_2O_5$, $La_2O_3$, $Sb_2O_5$, $WO_3$, MgO, $SrCO_3$, ZnO, and $Bi_2O_3$.

* * * * *

UNITED STATES PATENT AND TRADEMARK OFFICE
CERTIFICATE OF CORRECTION

PATENT NO. : 5,756,412
DATED : May 26, 1998
INVENTOR(S) : Hyo-Jong LEE, et al

It is certified that error appears in the above-identified patent and that said Letters Patent is hereby corrected as shown below:

On the title page, item [54] and col. 1, line 1;
--[54] DIELECTRIC CERAMIC COMPOSITIONS--.

Signed and Sealed this

Seventeenth Day of November, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,756,412

DATED : February 4, 1997

INVENTOR(S) : Hyo-Jong LEE, et al

It is certified that error appears in the above-identified patent and that said Letters Patent is hereby corrected as shown below:

Column 4, TABLE 3 should read as follows:

Table 3. Dielectric Characteristics of Solid Solution Compositions According to the Present Invention.

| COMPOSITION | PERMITTIVITY | Q x f | TEMPERATURE COEFFICIENT OF RESONANCE FREQUENCY ($\tau_f$) |
|---|---|---|---|
| $Mg(Nb_{0.1}Ta_{0.9})_2O_6$ | 21.7 | 80100 | -23.2 |
| $Mg(Nb_{0.2}Ta_{0.8})_2O_6$ | 18.8 | 56300 | -45.5 |
| $Mg(Nb_{0.4}Ta_{0.6})_2O_6$ | 19.4 | 64400 | -45.7 |
| $Mg(Nb_{0.6}Ta_{0.4})_2O_6$ | 20.0 | 69600 | -51.5 |
| $Mg(Nb_{0.8}Ta_{0.2})_2O_6$ | 20.3 | 93000 | -53.7 |
| $Zn(Nb_{0.1}Ta_{0.9})_2O_6$ | 37.1 | 38000 | -5.7 |
| $Zn(Nb_{0.3}Ta_{0.7})_2O_6$ | 33.6 | 48100 | 3.4 |
| $Zn(Nb_{0.4}Ta_{0.6})_2O_6$ | 33.6 | 45000 | -5.8 |
| $Zn(Nb_{0.5}Ta_{0.5})_2O_6$ | 30.5 | 53000 | -8.0 |
| $Zn(Nb_{0.6}Ta_{0.4})_2O_6$ | 24.0 | 54000 | -51.6 |
| $Ni(Nb_{0.4}Ta_{0.6})_2O_6$ | 23.6 | 27000 | 5.9 |
| $Ni(Nb_{0.5}Ta_{0.5})_2O_6$ | 23.1 | 29000 | 1.3 |
| $Ni(Nb_{0.6}Ta_{0.4})_2O_6$ | 22.7 | 35000 | -3.6 |

UNITED STATES PATENT AND TRADEMARK OFFICE
CERTIFICATE OF CORRECTION

PATENT NO. : 5,756,412

DATED : February 4, 1997

INVENTOR(S) : Hyo-Jong LEE, et al

It is certified that error appears in the above-identified patent and that said Letters Patent is hereby corrected as shown below:

Column 4, TABLE 4, should read as follows:

Table 4. Dielectric Characteristics of Solid Solution Compositions According to the Present Invention.

| COMPOSITION | $\varepsilon$ | Q x f | TEMPERATURE COEFFICIENT OF RESONANCE FREQUENCY ($\tau_f$) |
|---|---|---|---|
| $Ca_{1/3}Zn_{2/3}Nb_2O_6$ | 19.5 | 24000 | -52.5 |
| $Ca_{1/3}Ni_{2/3}Nb_2O_6$ | 19.0 | 30000 | -46.8 |
| $Mg_{1/3}Zn_{2/3}(Nb_{0.5}Ta_{0.5})_2O_6$ | 30.4 | 56000 | -51.3 |
| $Mg_{1/2}Zn_{1/2}(Nb_{0.5}Ta_{0.5})_2O_6$ | 28.7 | 59200 | -52.5 |
| $Mg_{2/3}Zn_{1/3}(Nb_{0.5}Ta_{0.5})_2O_6$ | 25.9 | 57600 | -53.0 |

UNITED STATES PATENT AND TRADEMARK OFFICE
CERTIFICATE OF CORRECTION

PATENT NO. : 5,756,412

DATED : February 4, 1997

INVENTOR(S) : Hyo-Jong LEE, et al

It is certified that error appears in the above-identified patent and that said Letters Patent is hereby corrected as shown below:

Column 5, TABLE 5, should read as follows:

Table 5. Dielectric Characteristics of Dielectric Ceramic Compositions Mixed with Additives According to the Present Invention.

| COMPOSITIONS | ADDITIVES (wt%) | $\varepsilon$ | $\tau_f$ | Q x f | SINTERING TEMPERATURE (°C) |
|---|---|---|---|---|---|
| $ZnNb_2O_6$ | CuO(1) | 21.5 | -60.7 | 61700 | 950 |
| $ZnNb_2O_6$ | CuO(2) | 19.0 | -70.5 | 29400 | 900 |
| $ZnNb_2O_6$ | $Sb_2O_5(1)$ | 19.8 | -32.5 | 25000 | 875 |
| $ZnNb_2O_6$ | $Bi_2O_3(1)$ | 22.3 | -60.9 | 63200 | 1000 |
| $ZnNb_2O_6$ | $V_2O_5(1)$ | 20.0 | -81.0 | 16880 | 900 |
| $Zn(Nb_{0.4}Ta_{0.6})_2O_6$ | $V_2O_5(1)$ | 28.2 | -19.0 | 21000 | 950 |
| $Zn(Nb_{0.4}Ta_{0.6})_2O_6$ | CuO(1) | 30.1 | -40.6 | 20500 | 950 |
| $Zn(Nb_{0.4}Ta_{0.6})_2O_6$ | $CuO+Bi_2O_3(1)$ | 32.3 | -5.2 | 19800 | 950 |
| $Zn(Nb_{0.5}Ta_{0.5})_2O_6$ | $MnCO_3(0.1)$ | 36.2 | -3.1 | 59000 | 1350 |
| $Zn(Nb_{0.5}Ta_{0.5})_2O_6$ | $La_2O_3(1)$ | 35.5 | -5.0 | 44700 | 1350 |
| $Zn(Nb_{0.5}Ta_{0.5})_2O_6$ | $WO_3(0.1)$ | 30.6 | 2.5 | 45500 | 1350 |
| $Zn(Nb_{0.5}Ta_{0.5})_2O_6$ | MgO(0.1) | 30.2 | -6.4 | 56300 | 1350 |
| $Zn(Nb_{0.5}Ta_{0.5})_2O_6$ | ZnO(0.1) | 33.5 | -1.4 | 45400 | 1300 |
| $Zn(Nb_{0.5}Ta_{0.5})_2O_6$ | $SrCO_3(0.1)$ | 38.2 | 5.9 | 48900 | 1350 |